UNITED STATES PATENT OFFICE.

AXEL KREFTING, OF CHRISTIANIA, NORWAY.

PROCESS OF TREATING SEAWEED.

SPECIFICATION forming part of Letters Patent No. 598,790, dated February 8, 1898.

Application filed November 21, 1896. Serial No. 612,999. (No specimens.) Patented in Norway April 28, 1896, No. 5,028.

*To all whom it may concern:*

Be it known that I, AXEL KREFTING, engineer, a subject of the King of Sweden and Norway, residing at Karl Johansgade 10, Christiania, Norway, have invented certain new and useful Improvements in Methods of Treating Seaweed to Obtain Valuable Products Therefrom, (for which I have obtained Letters Patent in Norway dated April 28, 1896, No. 5,028,) of which the following is a specification.

My invention relates to an improved method of treating seaweed to obtain valuable products therefrom.

The English chemist E. C. C. Stanford was the first to point out that different species of seaweed, besides containing the inorganic salts of technical importance—for instance, the iodids—also contain a valuable organic substance which he called "alzin acid." This substance he produced by boiling the seaweed for a long time in solutions of carbonate of potash or soda until the seaweed was decomposed and formed a soup. This he filtered, and then precipitated out of the clear solution the voluminous substance the alzin acid. The valuable properties of this matter have been exactly examined by E. C. C. Stanford, whose statements have been confirmed in all respects by me. I can entirely substantiate the correctness of Stanford's statements. I have also found other important properties in the material which up to the present time have not been thought of any importance.

The reason why Stanford, who has patented his invention in many countries, did not manage to produce the substance at such a cheap price that he could manufacture it was doubtless the long and expensive process of boiling the seaweed with the carbonates of potash or soda, which with thick leaves and stems are unable to effect the decomposition of the plant.

I have for a long time examined the different species of seaweed or tang and discovered that the substance which cements the vegetable fibers of the seaweed consists of the salt of lime of a peculiar organic acid which I have called the "tang" acid. This tang acid I have examined by means of organic elementary analysis and have found that the said acid consists of carbon, thirty-nine per cent.; hydrogen, five per cent.; oxygen, fifty-six per cent. The acid is not quite identical with Stanford's alzin acid, which is a mixed product that certainly for the most part contains tang acid, but which also is contaminated with other organic substances. That this must be the case is easily understood when we consider the long time during which the tang is to be boiled before it is decomposed according to the method of Stanford, for by producing the tang acid after the method in question the pure vegetable fibers which still remain after the filtration have by my analysis been shown to contain a proportionately considerable amount of nitrogenous substances.

During the long treatment of the tang with a warm solution of carbonate of potash or soda according to the method of Stanford a part of the nitrogenous substances is also decomposed, and the result is therefore that the so-called "alzin" acid is mixed with nitrogenous substances, from which English chemists have concluded that the alzin acid is a nitrogenous compound, which is not the case with the pure tang acid.

The method which is the subject of the present invention consists of the treatment of the seaweed with diluted sulfuric acid or other suitable acid before any other chemical treatment takes place, except a washing out or an elutriation with water in case this is desirable, so that the lime may be extracted. The seaweed does not change its appearance by this treatment, and its fibers seem to have the same cohesive power as before; but now it appears that the addition of a cold and very thin solution of alkalies or of carbonates of potash or soda effects a momentary solution of tang acid, which cements the vegetable fibers, because there is formed a salt of soda or potash and tang acid which is soluble in water. This circumstance effects the complete loosening of the vegetable fibers, which separate. If we now filter the liquid thus formed, we can in the filtrate precipitate the non-nitrogenous and pure tang acid with all its valuable properties.

The great advantage which this method has over Stanford's process consists in the rapidity with which the reactions take place and in the fact that no warming is necessary.

Having now particularly described and ascertained the nature of my said invention and in what manner the same is to be performed, I declare that what I claim is—

The method herein described of treating seaweed or tang consisting in extracting the lime therefrom by means of dilute sulfuric acid before any other chemical treatment of the seaweed is had, filtering the liquid, and finally precipitating the non-nitrogenous and pure tang acid, for the purpose specified.

In testimony that I claim the foregoing as my invention I have signed my name in presence of two subscribing witnesses.

AXEL KREFTING.

Witnesses:
O. SIGV. SORENSEN,
OLAF NIELSEN.